United States Patent [19]

Takenouchi

[11] Patent Number: 4,704,644

[45] Date of Patent: Nov. 3, 1987

[54] AUTOMATIC TAPE LOADING TYPE RECORDING AND/OR REPRODUCING APPARATUS HAVING MAGNETIC TAPE FAST-FORWARDING AND REWINDING MODES

[75] Inventor: Junji Takenouchi, Ayase, Japan

[73] Assignee: Victor Company of Japan, Ltd., Tokyo, Japan

[21] Appl. No.: 18,726

[22] Filed: Feb. 20, 1987

Related U.S. Application Data

[63] Continuation of Ser. No. 652,307, Sep. 19, 1984, abandoned.

[30] Foreign Application Priority Data

Sep. 24, 1983 [JP] Japan .......................... 58-147948[U]

[51] Int. Cl.⁴ .................... G11B 15/61; G11B 15/665
[52] U.S. Cl. .......................................... 360/85; 360/71
[58] Field of Search ............................ 360/85, 71, 95

[56] References Cited

U.S. PATENT DOCUMENTS

| | | | |
|---|---|---|---|
| 3,939,491 | 2/1976 | Shigeta | 360/85 |
| 4,121,267 | 10/1978 | Hayashi | 360/85 |
| 4,578,725 | 3/1986 | Muller | 360/85 |

FOREIGN PATENT DOCUMENTS 0092275 10/1983 European Pat. Off. ............. 360/85
0109160 7/1982 Japan ..................................... 360/85

Primary Examiner—Robert S. Tupper
Attorney, Agent, or Firm—Michael N. Meller

[57] ABSTRACT

An automatic tape loading type recording and/or reproducing apparatus comprises a tape loading mechanism having tape guide members for drawing out a magnetic tape from a tape cassette which is loaded into the recording and/or reproducing apparatus, and for wrapping the magnetic tape around the peripheral surface of a guide drum over a predetermined angular range, a half loading state setting mechanism for setting the tape loading mechanism to a half loading state so that each tape guide member assumes a predetermined position between a loading start position and a loading completed position, and a tape fast-forward and/or rewind mechanism for performing a tape fast-forwarding operation and/or a tape rewinding operation in a state where the tape loading mechanism is set to the half loading state. The magnetic tape moves under guidance of the tape guide members during fast-forward and rewind modes of the recording and/or reproducing apparatus.

6 Claims, 13 Drawing Figures

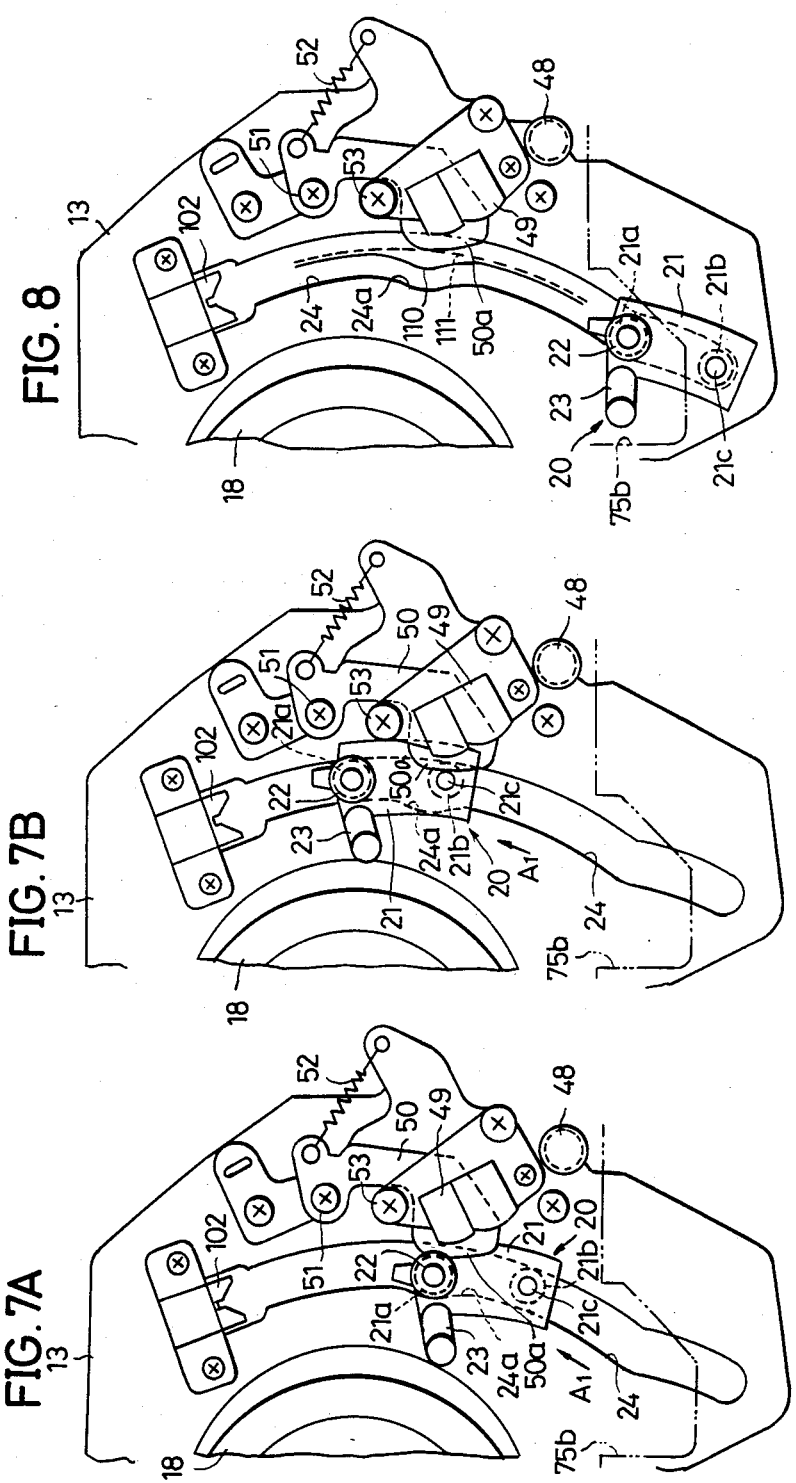

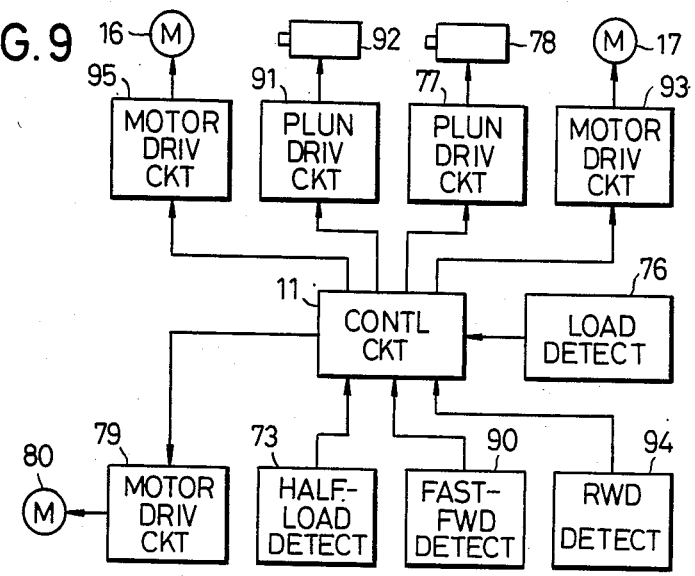
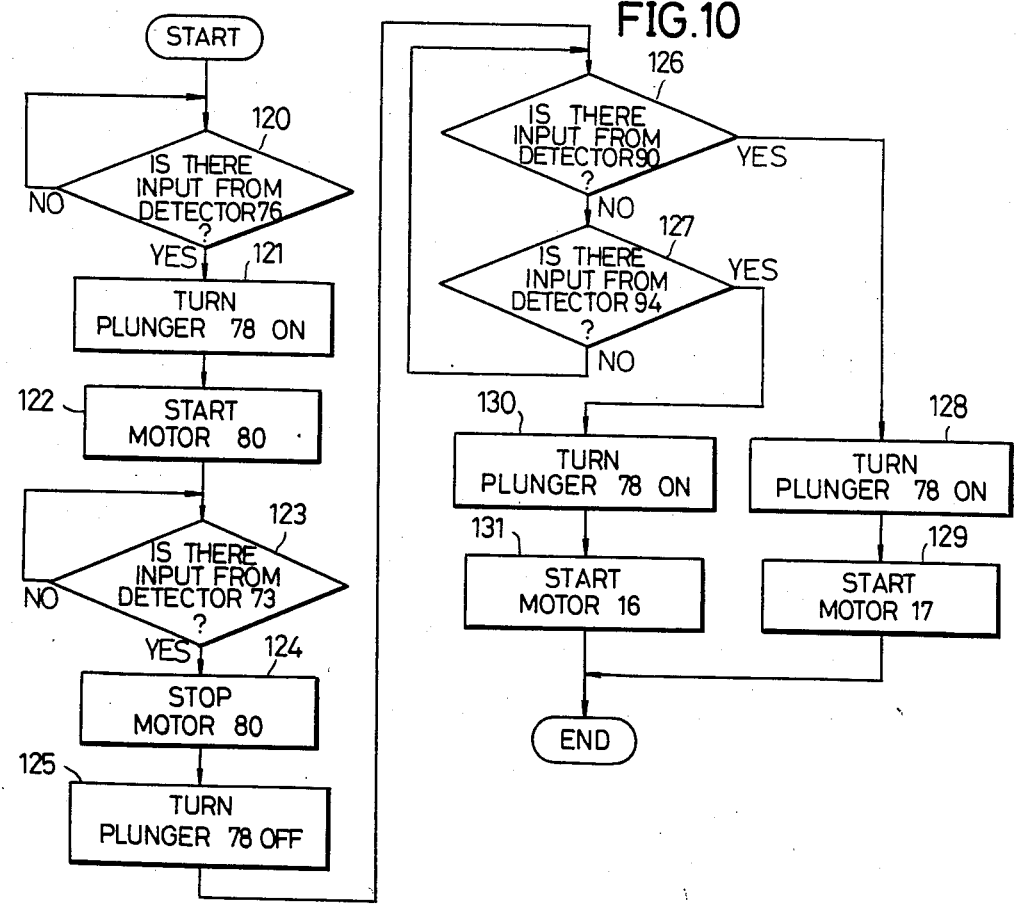

AUTOMATIC TAPE LOADING TYPE RECORDING AND/OR REPRODUCING APPARATUS HAVING MAGNETIC TAPE FAST-FORWARDING AND REWINDING MODES

This application is a continuation of application Ser. No. 652,307, filed 9/19/84, now abandoned. su

BACKGROUND OF THE INVENTION

The present invention generally relates to automatic tape loading type recording and/or reproducing apparatuses, and more particularly to an automatic tape loading type recording and/or reproducing apparatus in which the operations of rewinding and fast-forwarding a magnetic tape are carried out in a state where the magnetic tape is partly drawn out of a tape cassette and is guided by loading members.

In a video tape recorder (VTR) for home use, the operations of rewinding and fast-forwarding a magnetic tape are generally carried out in a state where the tape is accommodated within a tape cassette. For this reason, during the rewind and fast-forward modes of the VTR, the tape is moved at a high speed in a state where there is no restriction of the height position of the tape in a tape path portion which is formed along the front of the tape cassette. As a result, the tape vibrates in the width direction thereof while the tape undergoes the high-speed movement, and rolls of tape wound on reels of the tape cassette become irregular. In other words, the upper and lower surfaces of the tape rolls become irregular because of the vibration of the tape in the width direction thereof. When the tape cassette having such irregular tape rolls on the reels, is played on the VTR during a recording or reproducing mode, the moving path of the tape which is paid out of one of the tape rolls varies in the width direction of the tape. Consequently, the upper and lower edges of the tape are easily damaged. In addition, the tape movement becomes unstable, and the recording or reproducing operation of the VTR becomes affected by such unstable tape movement.

SUMMARY OF THE INVENTION

Accordingly, it is a general object of the present invention to provide a novel and useful automatic tape loading type recording and/or reproducing apparatus in which the problems described heretofore are eliminated.

Another and more specific object of the present invention is to provide an automatic tape loading type recording and/or reproducing apparatus in which the operations of rewinding and fast-forwarding a magnetic tape are carried out in a state where the tape is partly drawn out of a tape cassette and is guided by loading members which have the function of restricting the height position of the moving tape. According to the apparatus of the present invention, the height position of the tape is restricted during rewind and fast-forward modes of the apparatus, and the tape is moved in a state where the tape does not vibrate in the width direction thereof. As a result, rolls of tape are wound on reels of the tape cassette, so that the upper and lower surfaces of the tape rolls lie in horizontal planes. Consequently, the tape does not vibrate in the width direction thereof at positions where the tape is paid out of one of the tape rolls and where the tape is taken up on other tape roll. Therefore, it is possible to prevent the edges of the tape from becoming damaged during a high-speed movement thereof, and further, it is possible to ensure satisfactory recording and reproduction since the upper and lower surfaces of the tape rolls do not become irregular during the high-speed movement of the tape.

Other objects and further features of the present invention will be apparent from the following detailed description when read in conjunction with the accompanying drawings.

BRIEF DESCRIPTION OF THE DRAWINGS

FIGS. 7A and 7B are diagrams for explaining the operation of the take-up loading pole mechanism as the take-up loading pole mechanism moves along a guide groove on a sub-chassis and passes by a position opposing an audio and control head;

FIG. 8 is a diagram showing a moving locus of a vertical loading pole in correspondence with moving loci of cylindrical projections on the bottom of a base;

FIG. 9 is a block diagram showing a control system related to rewind and fast-forward operations which constitute an essential part of invention; and FIG. 10 is a flow chart showing the operation of a control circuit within the system shown in FIG. 9.

DETAILED DESCRIPTION

Figure 1:
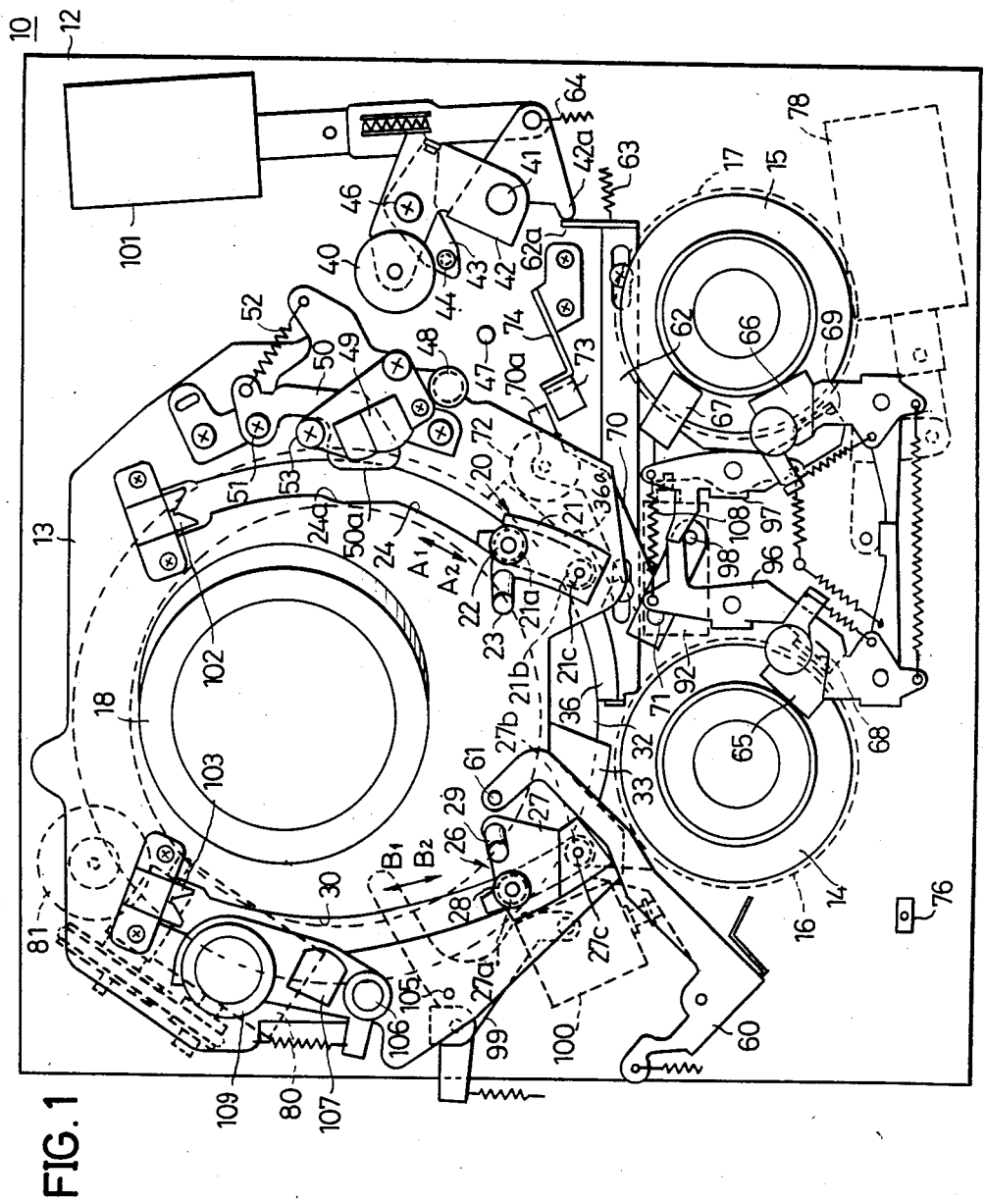
FIG. 1 is a plan view showing an embodiment of an automatic tape loading type recording and/or reproducing apparatus according to the present invention, in a state before a tape cassette is loaded into the recording and/or reproducing apparatus.
Figure 3:
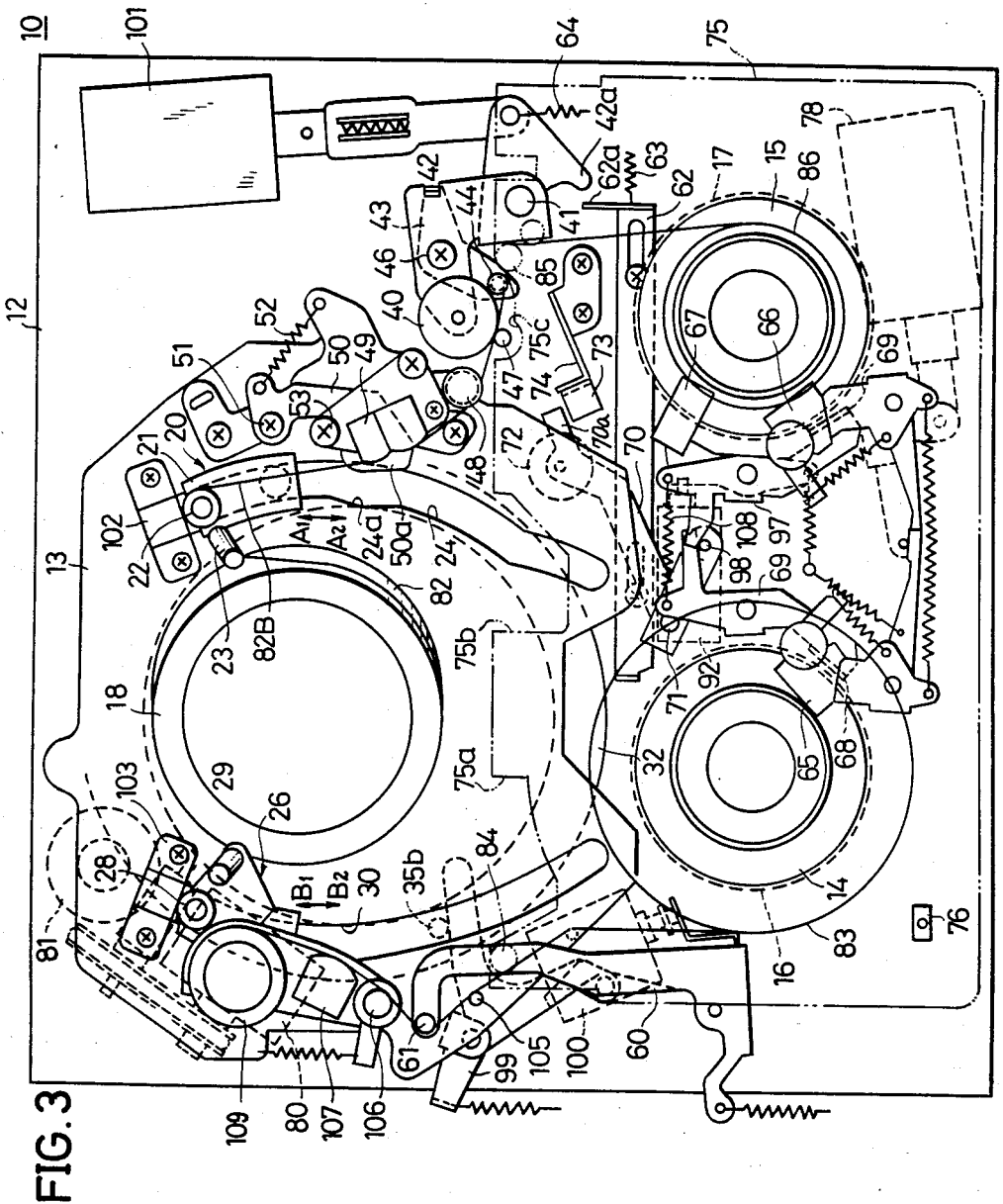
FIG. 3 is a plan view showing the recording and/or reproducing apparatus in a recording or reproducing mode.

The operation of an automatic tape loading type recording and/or reproducing apparatus 10 shown in FIGS. 1 and 3, is controlled by a control circuit 11 shown in FIG. 9. The control circuit 11 is constituted by a microcomputer. For convenience sake, the control circuit 11 will be described only in conjunction with the operations which constitute an essential part of the present invention.

The apparatus 10 comprises a main chassis 12 and a sub-chassis 13 which is located above the main chassis 12. A supply reel disc 14 and a take-up reel disc 15 are provided on the main chassis 12. The supply reel disc 14 is driven by a reel motor 16 which is provided exclusively therefor, and the take-up reel disc 15 is driven by a take-up reel motor 17 which is provided exclusively therefor. A guide drum 18 having one or a plurality of video heads, is provided on the sub-chassis 13.

Figure 5A:
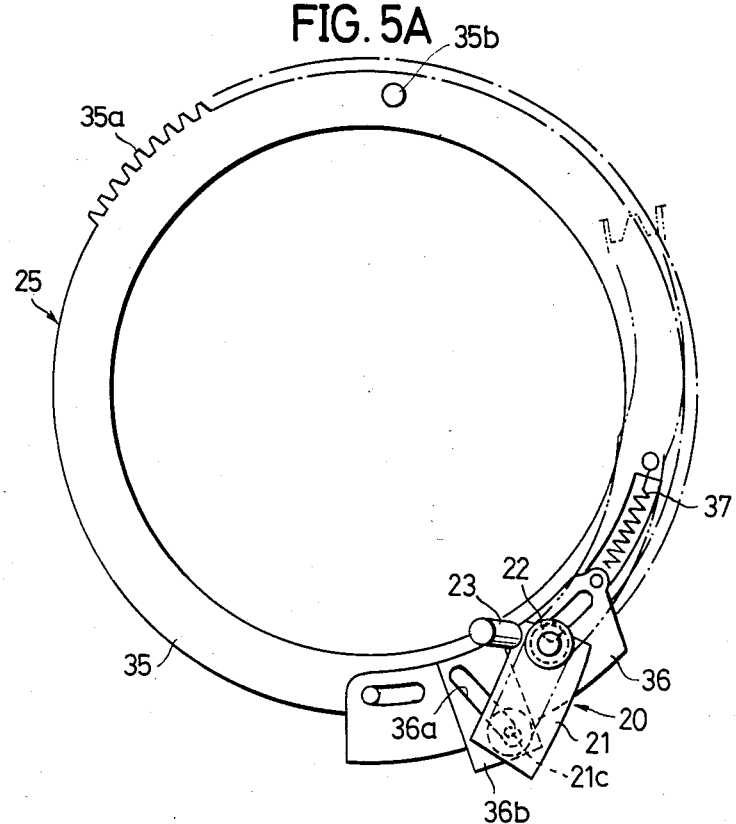
FIGS. 5A and 5B are a plan view and an elevation respectively showing a take-up loading pole mechanism together with a ring assembly which moves the take-up loading pole mechanism.
Figure 5B:
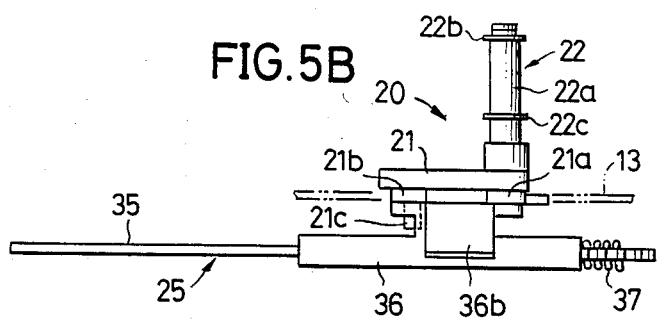
Figure 6:
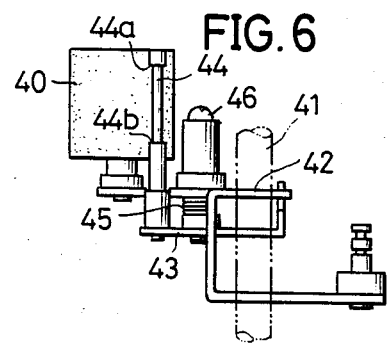
FIG. 6 is an elevation showing a mechanism including a pinch roller and a tape guide pole.

As shown in FIGS. 5A and 5B, a take-up loading pole mechanism 20 comprises a base 21, a vertical loading pole 22 and a sloping pole 23 respectively located on the base 21. The take-up loading pole mechanism 20 is movable along a guide groove 24 on the sub-chassis 13. The vertical loading pole 22 comprises a roller 22a, and fixed flanges 22b and 22c located above and below the roller 22a. The vertical loading pole 22 has the function of restricting the height position of a tape. Cylindrical projections 21a and 21b are provided on the bottom surface of the base 21. The cylindrical projection 21a is located immediately below the vertical loading pole 22. On the other hand, the cylindrical projection 21b has a pin 21c projecting downwardly from a center thereof, and this pin 21c is connected to a ring assembly 25 as shown in FIGS. 5A and 5B.

Figure 4A:
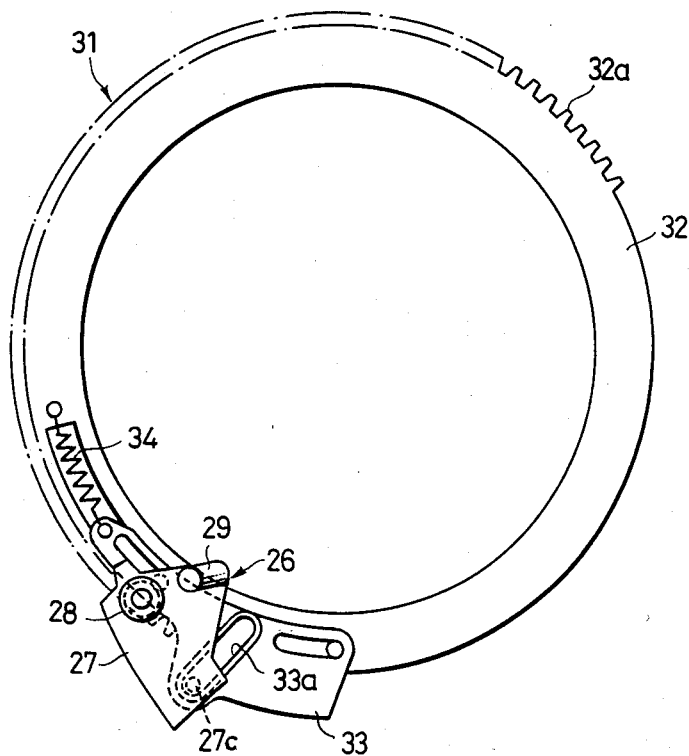
FIGS. 4A and 4B are a plan view and an elevation respectively showing a supply loading pole mechanism together with a ring assembly which moves the supply loading pole mechanism.
Figure 4B:
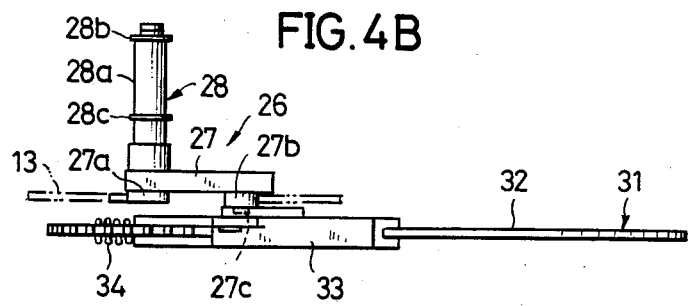

A supply loading pole mechanism 26 has a construction which is essentially the same as the construction of the take-up loading pole mechanism 25. As shown in FIGS. 4A and 4B, the supply loading pole mechanism 26 comprises a base 27, and a vertical loading pole 28 and a sloping pole 29 respectively located on the base 27. The supply loading pole mechanism 26 is movable along a guide groove 30 on the sub-chassis 13, in a state where cylindrical projections 27a and 27b on the bottom surface of the base 27 are guided by the guide groove 30. The cylindrical projection 27b has a pin 27c projecting downwardly from a center thereof, and this pin 27c is connected to a ring assembly 31 as in FIGS. 4A and 4B. The vertical loading pole 28 comprises a roller 28a, and fixed flanges 28b and 28c located above and below the roller 28a. The vertical loading pole 28 has the function of restricting the height position of the tape.

The ring assemblies 25 and 31 are rotatably supported on the main chassis 12, in a state where the ring assembly 31 is placed on top of the ring assembly 25. In the plan view, the ring assemblies 25 and 31 are arranged within a space between the main chassis 12 and the sub-chassis 13, so as to encircle the guide drum 18. The upper ring assembly 31 comprises a ring 32 which has a teeth part 32a formed over a predetermined angular range, a sliding member 33 slidably provided on the ring 32, and a coil spring 34 which acts on the sliding member 33 so as to pull the sliding member 33 in one direction. The pin 27 described before, is fitted within an elongated hole 33a of the sliding member, which elongated hole 33a extends along a radial direction of the ring 32. Similarly, as shown in FIGS. 5A and 5B, the lower ring assembly 25 comprises a ring 35, a sliding member 36, and a coil spring 37. The pin 21c described before, is fitted within an elongated hole 36a of the sliding member 36, which elongated hole 36a extends in a radial direction of the ring 35.

A pinch roller 40 is rotatably supported at a tip end of a pinch roller support arm 42 which is pivotally supported on a pin 41. A bracket 43 is unitarily formed with the support arm 42, and a tape guide pole 44 is located on the bracket 43. The tape guide pole 44 has flange parts 44a and 44b which guide the upper and lower edges of the tape, and has the function of restricting the height position of the tape. An adjusting screw 46 is screwed into the bracket 43, in a state where a compressed coil spring 45 is inserted between the support arm 42 and the bracket 43 and a spacer is inserted between the head of the adjusting screw 46 and the support arm 42. The height positions of the bracket 43 and the tape guide pole 44 are adjusted by rotating the adjusting screw 46. The tape guide pole 44 is set to a predetermined height position.

The shape and center of rotation of the support arm 42 are set as shown in FIG. 3 so that the pinch roller 40 presses against a capstan 47 at a position deviated leftwardly compared to the conventional apparatus, and so that the tape guide pole 44 makes contact with the tape between the pinch roller 40 and a tape guide 85 of a tape cassette 75 from the outer side (magnetic side) of the tape.

Figure 2:
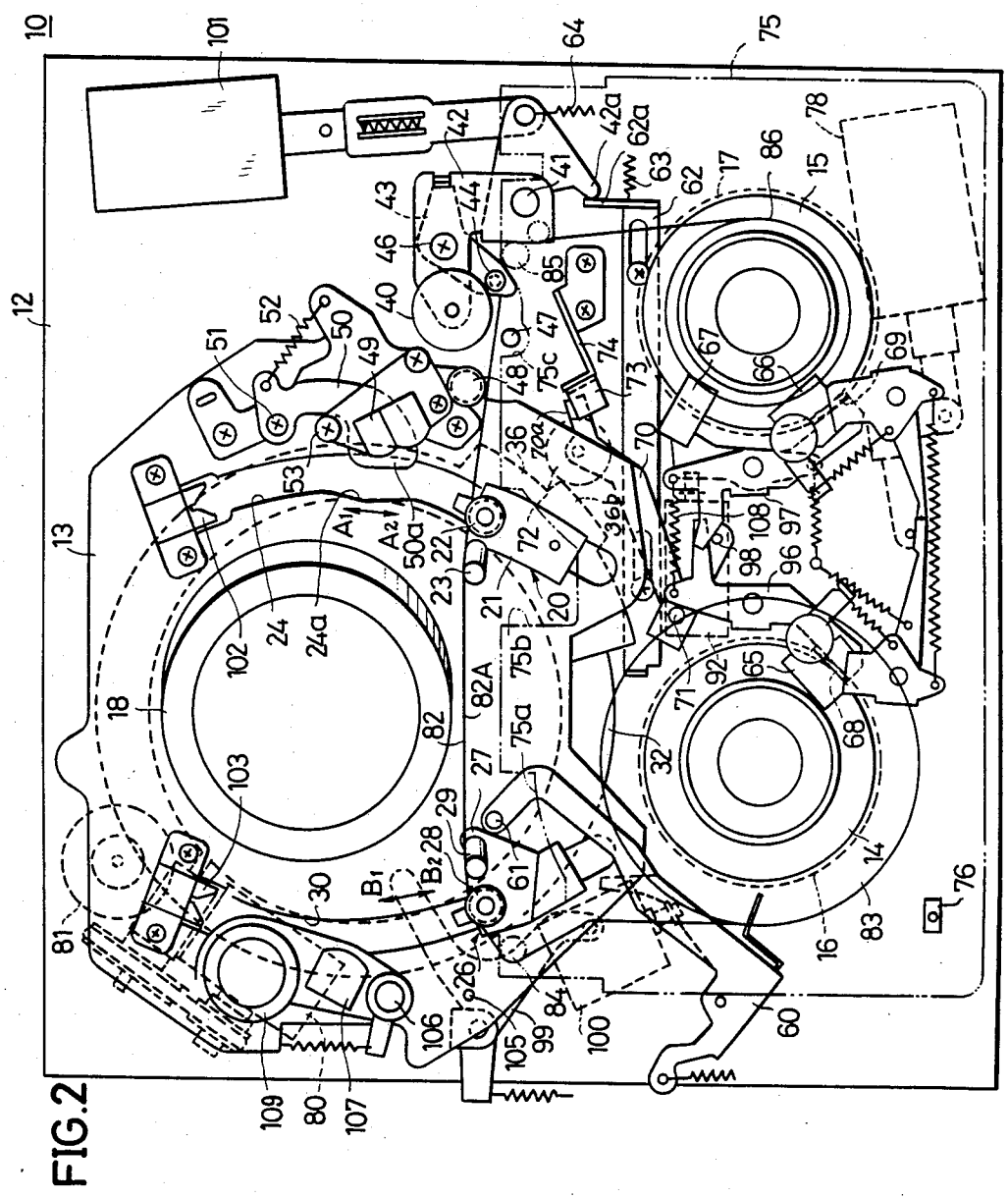
FIG. 2 is a plan view showing the recording and/or reproducing apparatus in a rewind or fast-forward mode.

Because the position where the pinch roller 40 makes contact with the tape is deviated leftwardly compared to the conventional apparatus, a tape guide pole 48 is arranged at a position deviated leftwardly in FIGS.1 through 3 compared to the conventional apparatus. This measure is taken so that the tape reaching a tape driving part which is made up of the pinch roller 40 and the capstan 47 does not make contact with the peripheral surface of the pinch roller 40. Further, an audio and control head (hereinafter simply referred to as an audio/control head) 49 is also arranged at a position deviated leftwardly in FIGS. 1 through 3 compared to the conventional apparatus, so that the audio/control head 49 positively makes contact with the tape. In other words, the audio/control head 49 is arranged at a position which is deviated towards the guide drum 18 and is extremely close to the guide groove 24.

Since the audio/control head 49 is arranged in the manner described above, the guide groove 24 has a widened part 24a at a position corresponding to the position of the audio/control head 49. Further, a guide plate 50 is pivotally supported on a pin 51 which is located on the sub-chassis 13. The guide plate 50 is urged clockwise by the action of a spring 52, and is stopped by a stopper 53 which is located on the sub-chassis 13. The guide plate 50 is arranged below the audio/control head 49, and a guide part 50a of the guide plate 50 hangs over the guide groove 24 at a position opposing the widened part 24a.

Before the tape cassette 75 is loaded into the apparatus 10, the ring assembly 25 assumes a rotational position shown in FIG. 5A, and the ring assembly 31 assumes a rotational position shown in FIG. 4A. The loading pole mechanism 20 and 26 assume positions shown in FIG. 1. A tension arm 60 is rotated clockwise in FIG. 1, and a tension pole 61 assumes a position close to the sloping pole 29. A left end of a slide plate 62 is engaged by the sliding member 36, and the slide plate 62 is slid leftwardly in FIG. 1 against the force of a spring 63. The support arm 42 is rotated clockwise in FIG. 1 by a spring 64, up to a position where an engaging part 42a of the support arm 42 makes contact with a bent engaging part 62a which is located on the right end of the slide plate 62. The pinch roller 40 assumes a position separated from the capstan 47. In addition, main brakes 65 and 66 and a loading tension brake 67 make contact with the corresponding reel discs 14 and 15, and assume active states. On the other hand, sub-brakes 68 and 69 are separated from the respective reel discs 14 and 15, and assume inactive states.

A rotary arm 70 which constitutes an essential part of the present invention, is pivotally supported on a pin 71, and is urged to rotate counterclockwise in FIG. 1 by the action of a spring (not shown). Before the tape cassette 75 is loaded into the apparatus 10, the rotary arm 70 assumes a position rotated counterclockwise, where a roller 72 provided on the tip end part of the rotary arm 70 makes contact with the outer peripheral surface of the sliding member 36. A shutter 70a located at the tip end of the rotary arm 70, assumes a position separated from a half loading detector 73. The detector 73 comprises a light emitting element (not shown) and a light receiving element (not shown) which oppose each other. The detector 73 is mounted on a bracket 74 which is located on the main chassis 12, at a position where the shutter part 70a can enter between the light emitting element and the light receiving element of the detector 73.

In this state, the tape cassette 75 is loaded into the apparatus 10 as shown in FIG. 2. When the tape cassette 75 is loaded into the apparatus 10, the vertical loading pole 28, the sloping pole 29, and the tension pole 61 relatively enter into a cutout 75a of the tape cassette 75. On the other hand, the vertical loading pole 22 and the sloping pole 23 relatively enter into a cutout 75b of the tape cassette 75. The capstan 47 relatively enters into a cutout 75c of the tape cassette 75.

A loaded tape cassette detector 76 comprises a microswitch, and is designed to detect the tape cassette 75 which is loaded into the apparatus 10. When the detector 76 detects the loaded tape cassette 75, a signal is produced from the control circuit 11 shown in FIG. 9, and this signal is supplied to a plunger driving circuit 77 so as to turn ON a plunger 78. When the plunger 78 is turned ON, the braking actions of the main brakes 65 and 66 are cancelled. In addition, a signal is supplied to a motor driving circuit 79 from the control circuit 11, so as to rotate a loading motor 80 in a forward direction. When the motor 80 rotates in the forward direction, the ring assembly 25 is rotated counterclockwise and the ring assembly 31 is rotated clockwise in FIG. 2, through a worm gear mechanism 81. As a result, the loading pole mechanism 20 moves in the direction of an arrow A1 along the guide groove 24, and the loading pole mechanism 26 moves in the direction of an arrow B1 along the guide groove 30.

When the ring assembly 25 rotates over approximately 10°, an outwardly projecting part 36b of the sliding member 36 pushes the roller 72 as shown in FIG. 2. Thus, the rotary arm 70 is rotated clockwise against the action of a spring (not shown), and the shutter part 70a enters between the light emitting element and the light receiving element of the detector 73. When the detector 73 detects the shutter part 70a, the control circuit 11 stops supplying the signal to the motor driving circuit 79, and the motor 80 stops rotating. The loading pole mechanism 21 and 26 stop at positions where a magnetic tape 82 is partly drawn out of the tape cassette 75, and the apparatus 10 assumes a half loading state. The slide plate 62 moves rightwardly as the ring assembly 25 rotates, and the support arm 42 is pushed and rotated counterclockwise by the bent engaging part 62a against the action of the spring 64. The pinch roller 40 moves closer to the capstan 47, and the tape guide pole 44 makes contact with the tape 82 from the outer side of the tape path with respect to the side of the tape cassette 75. In this state, the tape 82 is drawn out of a supply tape roll 83, and is guided outside the tape cassette 75 by a tape guide 84. The tape 82 is then guided by the vertical loading pole 28 and the sloping pole 29, and passes between the guide drum 18 and the tape cassette 75, without making contact with the guide drum 18. The tape 82 is further guided by the sloping pole 23 and the vertical loading pole 22, and passes between the capstan 47 and the pinch roller 40. The tape 82 is finally guided by the tape guide 85 and enters within the tape cassette 75, and the tape 82 is taken up on a take-up roll 86. As a result, a tape path 82A is formed from the supply tape roll 83 to the take-up tape roll 86. Further, in FIG. 9, the control circuit 11 stops supplying the signal to the plunger driving circuit 77.

Hence, the plunger 78 is turned OFF, and the main brakes 65 and 66 are activated.

Unless the apparatus 10 is operated, the apparatus 10 continues to assume the state described heretofore.

When the apparatus 10 is operated in this state so as to set the apparatus 10 to a fast-forward mode, a signal is supplied to the control circuit 11 from a fast-forward operation detector 90 shown in FIG. 9. The control circuit 11 supplies signals to plunger driving circuits 77 and 91 responsive to the signal from the detector 90, and plungers 78 and 92 are both turned ON. Accordingly, the braking actions of the main brakes 65 and 66 and the loading tension brake 67 are cancelled, as shown in FIG. 2. In addition, the control circuit 11 also supplies a signal to a motor driving circuit 93, so as to drive the reel motor 17. As a result, the tape 82 is taken up on the take-up tape roll 86 in FIG. 2, and the tape 82 moves in the tape path 82A in the forward direction at a high speed. In this state, the tape 82 is guided by the vertical loading pole 28 in the vicinity of the exit part of the tape cassette 75, is guided by the vertical loading pole 22 at an intermediate position, and is guided by the tape guide pole 44 in the vicinity of the entrance part of the tape cassette 75. The upper and lower edges of the tape 82 are guided by the fixed flanges 28b and 28c, the fixed flanges 22b and 22c, and the fixed flanges 44a and 44b, and the tape 82 moves in a state where the height position thereof is restricted. For this reason, the tape 82 will not vibrate in the width direction of the tape as the tape 82 moves at the high speed, and the tape 82 moves stably in the tape path 82A. The tape 82 is taken up on the take-up tape roll 86, so that the upper and lower surfaces of the take-up tape roll 86 are flat, that is, so that the upper and lower edges of the tape 82 each lie in one plane. In other words, the upper and lower surfaces of the take-up tape roll 86 are not irregular.

On the other hand, when the apparatus 10 is operated so as to set the apparatus 10 to a rewind mode, a signal from a rewind operation detector 94 shown in FIG. 9 is supplied to the control circuit 11. The control circuit 11 supplies signals to the plunger driving circuits 77 and 91 and to a motor driving circuit 95, responsive to the signal from the detector 94. Accordingly, the braking actions of the main brakes 65 and 66 and the loading tension brake 67 are cancelled, and the reel motor 16 is rotated. As in the case described before for the fast-forward mode, the tape 82 is guided by the tape guide pole 44 and the vertical loading poles 22 and 28 in a state where the height position of the tape 82 is restricted. The tape 82 moves in the reverse direction at the high speed, without vibrating in the width direction of the tape 82, and is taken up on the supply tape roll 83 so that the upper and lower surfaces of the supply tape roll 83 each lie on one plane.

Hence, during a recording mode, a forward reproduction mode, and a reverse reproduction mode which will be described later on in the specification, the tape 82 is drawn out of the tape roll 83 or 86 in a state where the height position of the tape 82 is maintained constant. Therefore, the tape 82 will not vibrate in the width direction of the tape 82 even at the exit part of the tape cassette 75 where the tape 82 leaves the tape cassette 75, and the height position of the tape 82 which is drawn out of the tape cassette 75 is maintained constant. As a result, the tape movement is stable, the edges of the tape 82 will not be damaged, and the flat upper and lower surfaces of the tape rolls 83 and 86 ensure satisfactory recording and reproduction.

During the fast-forward and rewind modes described before, the rotary arm 70 is rotated clockwise. Thus, sub-brake arms 96 and 97 disengage from a pin 98 which is located on the rotary arm 70, and the sub-brake arms 96 and 97 respectively rotate clockwise and counterclockwise by the action of a spring 108. The sub-brakes 68 and 69 push against the respective reel discs 14 and 15. Accordingly, braking forces are applied to the reel discs 14 and 15 for the purpose of applying a back tension on the tape 82.

When the apparatus 10 is operated during the fast-forward or rewind mode so as to set the apparatus to a stop mode, the control circuit 11 stops supplying the signal to the detector 90 or 94. Moreover, the control circuit 11 stops supplying the signals to the motor driving circuit 93 or 95 and to the plunger driving circuits 77 and 91. Accordingly, the reel motor 17 or 16 stops rotating, and the plungers 78 and 92 are turned OFF. As a result, the reel discs 14 and 15 are braked by the main brakes 65 and 66 and the brake 47, and the fast-forward or rewind operation is stopped.

When the apparatus 10 is operated in the half loading state so as to set the apparatus to a recording or reproducing mode, the plunger 78 is turned ON, and the braking actions of the main brakes 65 and 66 are cancelled. Hence, the motor 80 again starts to rotate in the forward direction, and the ring assemblies 25 and 31 respectively rotate counterclockwise and clockwise. The loading pole mechanisms 20 and 26 move along the respective guide grooves 24 and 30 in the directions of the arrows A1 and B1, respectively, while drawing the tape 82 out of the tape cassette 75. The loading tension brake 67 pushes against the take-up reel disc 15, and assumes the braking state. The tape 82 is thus drawn out of the supply tape roll 83, outside the tape cassette 75. The tension arm 60 once rotates up to a position where the tension arm 60 is engaged by a cancelling lever 99. In a final stage of the loading operation, the cancelling lever 99 is engaged by a projection 35b on the ring 35, and is rotated clockwise. The tension arm 60 disengages from the cancelling lever 99, and rotates counterclockwise to a final position shown in FIG. 3. As a result, a transformer 100 for varying the rotational speed of the motor 16, is operated. In addition, a plunger 101 is turned ON, and the support arm 42 rotates counterclockwise so that the pinch roller 40 presses against the capstan 47. The tape guide pole 44 enters into the cutout 75c of the tape cassette 75.

The loading pole mechanisms 20 and 26 move up to final positions where the loading pole mechanisms 20 and 26 are stopped by respective stoppers 102 and 103. As shown in FIG. 3, the tape 82 forms a predetermined tape path 82B including a tape path portion in which the tape 82 makes contact with the peripheral surface of the guide drum 18 over a predetermined angular range. The tape 82 is guided by the tape guide 84, and is drawn out of the supply tape roll 83 outside the tape cassette 75. The tape 82 successively makes contact with a guide pin 105, the tension pole 61, a guide roller 106, a full-width erasing head 107, and an impedance roller 109. The tape 82 makes contact with the peripheral surface of the guide drum 18 between the sloping poles 29 and 23, and then makes contact with the audio/control head 49 and the tape guide pole 48. Further, the tape 82 is pinched between the pinch roller 40 and the capstan 47, and makes contact with the tape guide pole 44. Finally, the tape 82 is guided by the tape guide 85, and enters into the tape cassette 75 to be taken up on the take-up tape roll 86.

When the tape loading operation is completed, the capstan 47 rotates in the forward direction, and the tape 82 is driven in a state where the tape 82 is pinched between the pinch roller 40 and the capstan 47. The tape 82 moves in the predetermined tape path 82B, and the recording or reproduction is carried out with respect to the tape 82 while the tape 82 is in contact with the peripheral surface of the guide drum 18. When the apparatus 10 is operated so as to set the apparatus to a reverse reproduction mode, the capstan 47 rotates in the reverse direction, and the tape 82 is drawn out of the take-up tape roll 86. In this case, the tape 82 moves in the reverse direction in the predetermined tape path 82B, and the tape 82 is taken up on the supply tape roll 83. Hence, the reverse reproduction is carried out. On the other hand, when the apparatus 10 is operated so as to set the apparatus to a forward search mode or a reverse search mode, the capstan 47 is rotated in the forward or reverse direction at a speed which is faster than the normal speed. In this case, the tape 82 is moved at a speed which is approximately ten times the normal tape moving speed, in a state where the tape 82 is pinched between the pinch roller 40 and the capstan 47, and the forward search or the rewind search is carried out.

In each of the modes described above, the tape 82 in the tape path between the pinch roller 40 and the tape guide 85 moves in a state where the height position of the tape 82 is restricted by the tape guide pole 44. Accordingly, while the tape 82 moves in the forward direction, the tape 82 which is driven by a pinch drive part made up of the pinch roller 40 and the capstan 47, is restricted of the height position by the tape guide pole 44, and enters into the tape cassette 75 under the guidance of the tape guide 85. For this reason, the tape 82 moves stably in a tape path between the pinch drive part and the take-up tape roll 86, and the upper and lower edges of the tape 82 which is taken up coincide with the upper and lower edges of the tape 82 which is already on the take-up tape roll 86. In othe words, the upper and lower surfaces of the take-up tape roll 86 are flat. When the tape 82 moves in the reverse direction, the tape 82 which is drawn out of the tape cassette 75 under the guidance of the tape guide 85, is guided and is restricted of the height position by the tape guide pole 44, before reaching the pinch drive part. Hence, the tape 82 moves to the pinch drive part in a state where the height position of the tape 82 is restricted by the tape guide pole 44. Therefore, the height position of the tape 82 is maintained constant as the tape 82 moves past the pinch drive part. As a result, the tape 82 moves stably in the tape path towards the guide drum 18, and the undesirable effect on the reproduced picture during the reverse reproduction mode is prevented beforehand. Consequently, a satisfactory reproduced picture can be obtained even during the reverse reproduction mode.

Furthermore, in each of the modes described before, the rotary arm 70 is rotated counterclockwise, and the braking actions of the sub-brakes 68 and 69 are cancelled. Moreover, the braking action of the loading tension brake 67 is also cancelled.

When the apparatus 10 is operated so as to set the apparatus to a stop mode in a state where the apparatus 10 assumes one of the modes described before, the members related to the tape loading operation operate in directions opposite to those at the time of the tape loading operations. The loading pole mechanisms 20 and 26 respectively move in the directions of arrows A2 and B2, and once return to the positions shown in FIG. 1. Thereafter, the loading pole mechanisms 20 and 26 respectively move slightly in the directions of the arrows A1 and B1, and then stop. Thus, the apparatus 10 assumes the state shown in FIG. 2. When an eject operation is performed in this state, the loading pole mechanisms 20 and 26 respectively return to the positions shown in FIG. 1, and the tape cassette 75 is ejected from the apparatus 10.

Next, description will be given with respect to the operation of the apparatus 10 as the loading pole mechanism 20 passes by a position opposing the audio/control head 49, by referring to FIGS. 7A and 7B.

As described before, the loading pole mechanism 20 in the direction of the arrow A1 while the cylindrical projections 21a and 21b are guided by the guide groove 24, in a state where the pin 21c is pushed by the side wall of the elongated hole 36a. As the vertical loading pole 22, which is located at a leading position with respect to the moving direction of the loading pole mechanism 20, approaches the position opposing the audio/control head 49, the base part of the vertical loading pole 22 makes contact with and is guided by the guide part 50a of the guide plate 50 which hangs over the guide groove 24. As shown in FIG. 7A, the loading pole mechanism 20 rotates counterclockwise about the cylindrical projection 21b, and the vertical loading pole 22 moves without hitting the audio/control head 49. The the loading pole mechanism 20 can rotate counterclockwise in this manner, because the cylindrical projection 21a enters within the widened part 24a of the guide groove 24. As the vertical loading pole 22 passes in front of the audio/control head 49, the guiding action of the guide part 50a with respect to the vertical loading pole 22 is cancelled. Thus, the cylindrical projection 21a is guided by the widened part 24a and returns within the guide groove 24, and the loading pole mechanism 20 rotates clockwise about the cylindrical projection 21b.

Parts of the loading pole mechanism 20 other than the vertical loading pole 22, moves without being guided by the guide part 50a. As shown in FIG.7B, the cylindrical projection 21b moves along the center of the guide groove 24, without entering into the widened part 24a of the guide groove 24.

In other words, the loading pole mechanism 20 undergoes an oscillating movement at the widened part 50a, and the vertical loading pole 22 moves along the guide part 50a as indicated by a solid line 110 in FIG. 8. The cylindrical projection 21b moves along the guide groove 24, and moves as indicated by a phantom line 111 in FIG. 8. Because the cylindrical projection 21b moves along the guide groove 24 without being guided by the guide part 50a, a moving range of the pin 21c falls within the range of the elongated hole 36a in the sliding member 36. Hence, even in a case where the moving range of the ring assembly 25 in the radial direction thereof exceeds the range of the elongated hole 36a, no inconveniences will be introduced by the use of the ring assembly 25.

During the tape unloading operation, the vertical loading pole 22 moves while moving away from the audio/control head 49 so as not to make contact with the audio/control head 49, similarly as in the case of the tape loading operation.

The guide plate 50 is not fixed, and is positioned in a state where the guide plate 50 is urged to rotate by the spring 52 and is stopped by the stopper 53. For this reason, even in a case where the guide part 50a hangs over the guide groove 24 in excess, the guide part 50a is pushed back to recede as the guide plate 50 is pushed and rotated counterclockwise by the vertical loading pole 22 against the action of the spring 52. Hence, the smooth movement of the vertical loading pole 22 is ensured. In other words, the smooth movement of the loading pole mechanism 20 is unaffected by the error in the mounting position of the guide plate 50.

Next, description will be given with respect to the operation of the microcomputer which constitutes the control circuit 11 shown in FIG. 9, by referring to the flow chart shown in FIG. 10.

When a power source switch of the apparatus 10 is turned ON, the microcomputer discriminates whether there is an input signal from the loaded tape cassette detector 76, in a step 120. When the tape cassette 75 is loaded into the apparatus 10 and the detector 76 produces a signal, the discrimination result in the step 120 is YES, and the plunger 78 is turned ON in a subsequent step 121 so as to cancel the braking with respect to the reel discs 14 and 15. The loading motor 80 is started in a step 122. A step 123 discriminates whether there is an input signal from the half loading detector 73. When the half loading operation is completed and the discrimination result in the step 123 is YES, the loading motor 80 is stopped in a step 124. A step stops the supply of a current to the plunger 78, so as to turn the plunger 78 OFF.

When the apparatus 10 is stopped in the half loading state, a step 126 discriminates whether there is an input signal from the fast-forward operation detector 90. If the discrimination result in the step 126 is NO, a step 127 discriminates whether there is an input signal from the rewind operation detector 94.

If the discrimination result in the step 126 is YES, the plunger 78 is turned ON in a step 128, and the reel motor 17 is started in a step 129. As a result, the apparatus 10 assumes the fast-forward mode.

On the other hand, if the discrimination result in the step 127 is YES, the plunger 78 is turned ON in a step 130, and the reel motor 16 is started in a step 131. Hence, the apparatus 10 assumes a rewind mode.

Further, the present invention is not limited to these embodiments, but various variations and modifications may be made without departing from the scope of the present invention.

What is claimed is:

1. An automatic tape loading type recording and/or reproducing apparatus comprising:
  a guide drum having one or a plurality of video heads;
  tape loading means for drawing out a magnetic tape from a tape cassette which is loaded into said recording and/or reproducing apparatus, and for wrapping the magnetic tape around a peripheral surface of said guide drum over a predetermined angular range, said tape loading means comprising vertical tape guide members having flange parts for guiding upper and lower edges of the magnetic tape so as to restrict the height position of the magnetic tape, and driving means for moving each of said tape guide members between a loading start position within the loaded tape cassette and a loading completed position, each of the tape guide members making contact with one surface of said magnetic tape while said tape loading means draws said magnetic tape out from the loaded tape cassette, said magnetic tape being wrapped around the peripheral surface of said guide drum over the predetermined angular range so that the peripheral surface of said guide drum makes contact with the other surface of said magnetic tape when each of the tape guide members assumes the loading completed position;

half loading state setting means for setting said tape loading means to a half loading state, each of said tape guide members assuming a predetermined position between the loading start position and the loading completed position when said tape loading means is set to the half loading state, each of said tape guiding members in the predetermined position making contact with the one surface of said magnetic tape and guiding said magnetic tape to form a predetermined tape path which extends outside the loaded tape cassette and is separate from the peripheral surface of said guide drum; and tape fast-forward and/or rewind means for performing a tape fast-forwarding operation and/or a tape rewinding operation in a state where said tape loading means is set to the half loading state, said magnetic tape moving under guidance of said tape guide members during fast-forward and rewind modes of said recording and/or reproducing apparatus.

2. A recording and/or reproducing apparatus as claimed in claim 1 in which said half loading state setting means comprises detecting means for producing a detection signal when it is detected that at least one of said tape guide members has reached said predetermined position between the loading start position and the loading completed position, and stopping means for stopping said driving means responsive to the detection signal from said detecting means.

3. A recording and/or reproducing apparatus as claimed in claim 1 in which said tape guide members are made up of a first tape guide member for guiding the magnetic tape in the loading completed position thereof on an upstream side of said guide drum with respect to a movement of the magnetic tape, and a second tape guide member for guiding the magnetic tape in the loading completed position thereof on a downstream side of said guide drum with respect to the movement of the magnetic tape, and said first and second guide members restricting the height position of said magnetic tape which moves during the fast-forward operation and/or a rewind operation in a state where each of said first and second tape guide members assumes said predetermined position.

4. A recording and/or reproducing apparatus as claimed in claim 3 in which each of said first and second tape guide members comprises a roller which is rotatable in accordance with the movement of the magnetic tape, and flange parts respectively located on upper and lower parts of said roller, for guiding the upper and lower edges of the magnetic tape.

5. A recording and/or reproducing apparatus as claimed in claim 1 which further comprises a vertical auxiliary tape guide member having flange parts for guiding the upper and lower edges of the magnetic tape so as to restrict the height position of the magnetic tape, and displacing means for displacing said auxiliary tape guide member to make contact with the magnetic tape which moves under the guidance of said tape guide members during the fast-forward and rewind modes of said recording and/or reproducing apparatus.

6. A recording and/or reproducing apparatus as claimed in claim 1 which further comprises detecting means for producing a detection signal when it is detected that the tape cassette has been loaded into said recording and/or reproducing apparatus, and said tape loading means is operated and set to said half loading state responsive to the detection signal from said detecting means.

* * * * *